J. A. CHAUFOURIER.
Cotton Gin.
No. 65,643.
Patented June 11, 1867.
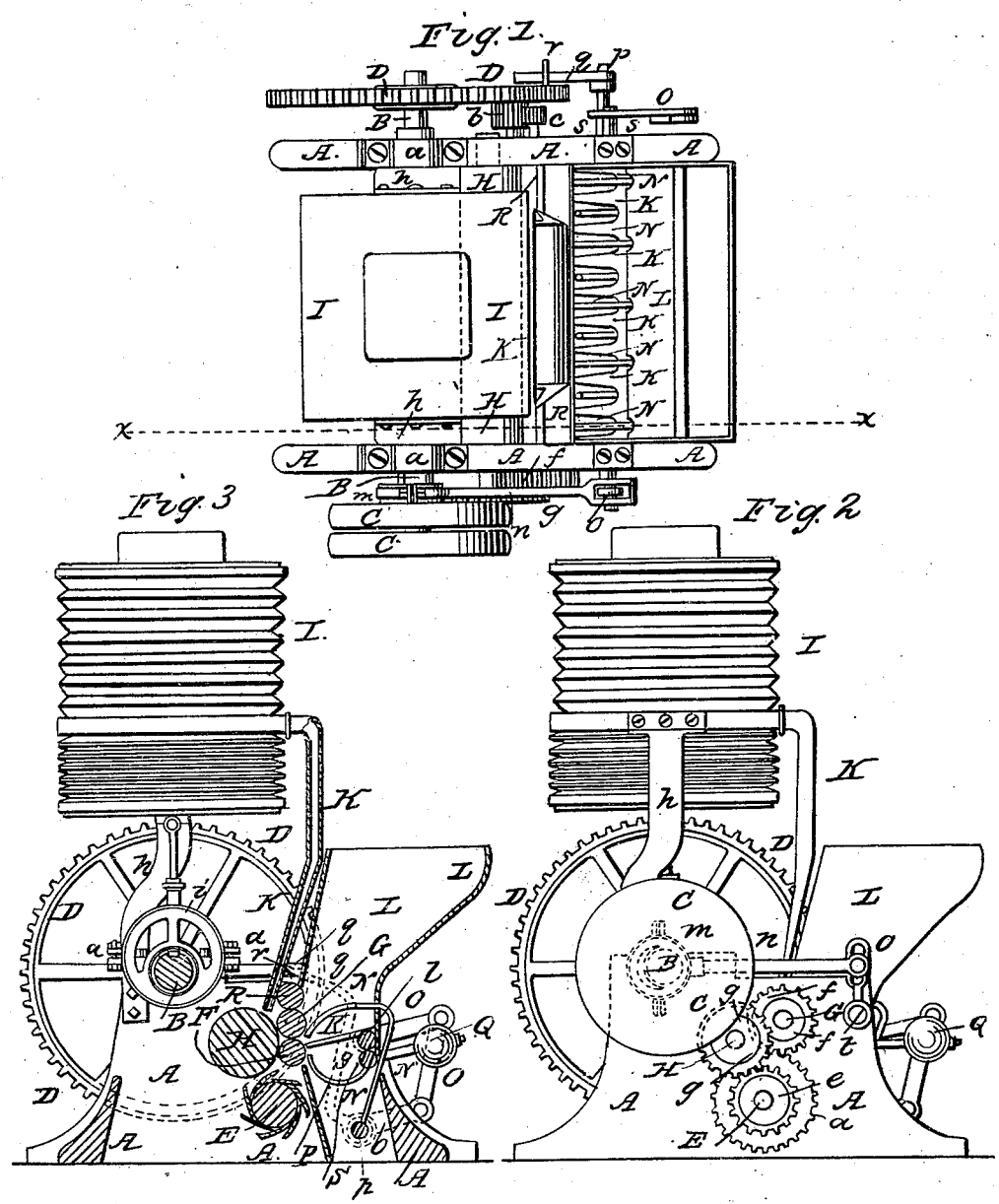

United States Patent Office.

JULES ALFRED CHAUFOURIER, OF PARIS, FRANCE.

Letters Patent No. 65,643, dated June 11, 1867.

---

COTTON-GIN.

---

The Schedule referred to in these Letters Patent and making part of the same.

---

TO ALL WHOM IT MAY CONCERN:

Be it known that I, JULES ALFRED CHAUFOURIER, of Paris, France, have invented a new and improved Self-Feeding Cotton-Gin; and I do hereby declare that the following is a full, clear, and exact description thereof, which will enable others skilled in the art to make and use the same, reference being had to the accompanying drawings, forming part of this specification.

This invention relates to a machine in which the cotton is fed to the rollers by the action of the machine itself, thus dispensing with the manual feed that was heretofore used for the purpose.

My invention consists, first, in the said feeding arrangement; second, in the application of supporting-shafts or cylinders which are laid over the shelling or picking-cylinders, and revolve with them for the purpose of permitting the use of shelling or picking-cylinders of any desired length; third, in the application to cotton-gins of a self-acting blower or bellows injecting cold air for the purpose of cooling the shelling-cylinders and other working parts and for preventing the cotton from being overheated. This blower attachment is chiefly intended for long-staple cotton-gins, in which the carrying-drum has but a small diameter and is rotated very rapidly. In the annexed drawings my invention is illustrated—

Figure 1 being a plan or top view of my improved self-feeding cotton-gin.

Figure 2 is a side elevation of the same.

Figure 3 is a vertical longitudinal sectional view of the same, taken on the line $x\ x$, fig. 1.

Similar letters of reference indicate like parts.

A represents a bed or frame, which is made of iron or other suitable material, and which is strong enough to support all the working parts of my machine. A horizontal driving-shaft, B, is laid across this frame hanging in suitable boxes $a$. This shaft is operated by pulleys C, or by a crank in any other suitable manner. On one end B of the shaft is arranged a large gear-wheel, D, which meshes into a pinion, $b$, attached to one end of a horizontal roller, E. The pinion $b$ gears into another pinion $c$ on the end of the lower shelling-cylinder F. On the roller E, on the end opposite to the pinion $b$, are secured two gear-wheels $d$ and $e$. The wheel $d$ gears into a pinion, $f$, on the upper shelling-cylinder G. The wheel $e$ drives the pinion $g$ on the driving-cylinder H. As to this cylinder is imparted a rapid rotary motion, and as it is of a comparatively small diameter, it is necessary to apply to it a constant current of air, whereby the said cylinder H is kept constantly cool. This current is obtained from a blower or bellows, I, which is set above the driving-shaft B and held by standards $h$, as seen in figs. 1 and 2. The cam $i$ on the shaft B sets the bellows in motion. The air is conducted through one or more tubes K from the bellows to the cylinder H. L is a hopper arranged in front of and above the picking-cylinders F and G. The bottom of the hopper consists of the comb or rack $k$, which oscillates around the axis $l$; the said rack is intended to lift up the material and allow the liberation of the seed which drops into the box M. Thus the shelling-cylinder cannot be obstructed. Motion is imparted to the axle $l$ by means of an eccentric cam, $m$, (shown in dotted lines in fig. 2,) which is mounted on the shaft B, and is connected by a rod, $n$, to a slotted lever, $o$, on the axle $l$. This slotted lever allows of a proper regulation. Another rack, N, which consists of a series of curved rods which are secured to an oscillating axle $p$, is operated by a lever, $q$, upon which is acting a pin, $r$, on the wheel D, (as shown in fig. 1, and by dotted lines in fig. 3.) The axle $p$ is connected to another axle S by toggle-levers O. On the axle $s$ is also set a series of fingers P, as shown in figs. 1 and 3. A counter-weight Q may be secured to either axle $p$ or $s$, so as to replace the racks into their former position after the lever $q$ has been depressed by the pin $r$. If the shelling-cylinder G were to have a certain length, or if a deflection would be feared, it will be advisable to arrange the supporting cylinder R, which hangs in the frame A, and is rotated by friction from the cylinder G. The raw material is placed into the hopper L. The cotton is fed to the rollers F and G by the rack N, the rack P preventing the clogging of these rollers by an excessive quantity. The cylinder H is cleared by the roll or doctor E, which is provided for this purpose with small blades or flexible pallets, as seen in fig. 3.

What I claim as new, and desire to secure by Letters Patent, is—

1. The self-feeding apparatus, consisting of the racks or combs $k$, N, and P, and the manner of operating the same, substantially as herein shown and described.

2. The self-operating refrigerator or bellows I for the purpose of conducting a current of air towards the driving or carrying-cylinder H, substantially as herein shown and described.

3. I claim one or more supporting-cylinders R, for the purpose of preventing a deflection of the shelling-cylinders, substantially as herein shown and described.

A. CHAUFOURIER.

Witnesses:
 A. GUION,
 DEMOS.